United States Patent [19]
Adams

[11] Patent Number: 5,536,045
[45] Date of Patent: Jul. 16, 1996

[54] DEBIT/CREDIT CARD SYSTEM HAVING PRIMARY UTILITY IN REPLACING FOOD STAMPS

[76] Inventor: Thomas W. Adams, 3619 Mill Run, Raleigh, N.C. 27612

[21] Appl. No.: 365,561

[22] Filed: Dec. 28, 1994

[51] Int. Cl.$^6$ .................................................. B42D 15/00
[52] U.S. Cl. ........................................................ 283/67
[58] Field of Search ................... 283/67, 70, 901, 283/904, 72, 73, 17

[56] References Cited

U.S. PATENT DOCUMENTS

| | | | |
|---|---|---|---|
| 2,963,220 | 12/1960 | Kosten et al. | 283/17 X |
| 3,350,800 | 11/1967 | Witt et al. | 283/17 X |
| 4,175,775 | 11/1979 | Kruegle . | |
| 4,222,662 | 9/1980 | Kruegle . | |
| 4,443,027 | 4/1984 | McNeely et al. . | |
| 4,536,013 | 8/1985 | Haghiri-Thermi et al. | 283/77 |
| 4,594,663 | 6/1986 | Nagata et al. . | |
| 4,643,453 | 2/1987 | Shapiro et al. . | |
| 4,921,278 | 5/1990 | Shiang et al. . | |
| 4,947,028 | 8/1990 | Gorog . | |
| 4,972,476 | 11/1990 | Nathans . | |
| 5,090,736 | 2/1992 | Minkus . | |
| 5,161,826 | 11/1992 | Von Giesen et al. | 283/77 |
| 5,202,826 | 4/1993 | McCarthy . | |
| 5,287,269 | 2/1994 | Dorrough et al. . | |
| 5,358,582 | 10/1994 | Koshrenka et al. | 283/77 X |

*Primary Examiner*—Willmon Fridie, Jr.
*Attorney, Agent, or Firm*—Richard S. Faust

[57] ABSTRACT

A debit card system replaces food stamps. A photo ID card issued to the food assistance recipient displays an arrangement of numerals that encode and reveal a unique PIN when overlaid by an appropriate mask. The clerk's use of the mask to determine the PIN puts the authorized recipient's photograph in full view of the clerk for at least several seconds, thereby compelling the clerk's unsupervised compliance regarding verification of the identity of the user of the card.

10 Claims, 5 Drawing Sheets

5,536,045

DEBIT/CREDIT CARD SYSTEM HAVING PRIMARY UTILITY IN REPLACING FOOD STAMPS

FIELD OF THE INVENTION

The invention relates to electronic debit/credit card systems. In a particular application, the invention relates to the administration of public assistance programs through issuance of debit cards to recipients of aid, for example, recipients of monetary assistance for the purchase of food.

BACKGROUND OF THE INVENTION

The present method of providing food for needy persons who are dependent on public assistance is the distribution of coupons which are known as food stamps. Books of coupons are issued to recipients. The value of the various coupons in each book may be $1.00, $5.00 and $10.00 and the total value of each book typically does not exceed $65.00. The coupons in each book have identical serial numbers, but no two books have the same serial numbers.

The wording on each coupon states that it is non-transferable and a statement on each coupon book warns of severe penalty for any improper use of a coupon. Yet a food merchant may, as change, issue food stamps taken from a different coupon book. This makes it impossible for another store receiving these food stamps in a subsequent transaction to know whether the holder of these food stamps is their true owner.

Furthermore, the recipient of food stamps is not required to present any identification or other proof that he or she is the true owner of the food stamps issued to him or her.

The looseness of the present method of distribution of food stamps invites a variety of improper uses—ranging from paying for a baby sitter or car repairs to selling the food stamps for cash with which to purchase drugs. Misuses of a more petty nature grow out of cash change which is given to the welfare recipient in almost every cash transaction.

Not only does the present system of food stamp distribution invite fraudulent practices, it often subjects worthy, underprivileged citizens to ridicule. Some of these citizens relate stories of grocery store clerks who make a point of handling food stamps in a manner which attracts the attention and scorn of others in line at grocery store checkout counters. The apparent purpose of this practice is to embarrass the shopper who is using the food stamps to buy groceries.

In addition to the obvious faults of food stamp systems similar or comparable to those described above, millions of trees are destroyed each year to provide the tons of paper for food stamps and record keeping by all of those employees who are needed to account for the use and disposition of food stamps turned in by merchants and who are needed to estimate the lost, destroyed or unspent stamps.

Thus, there is a need for a new system that will prevent the fraud and waste which now appear to be common through the use of food stamps and which, through the use of an efficient system, will eliminate the excessive cost of administering the present system. These goals may be achieved without reducing any needy recipient's allocation. The system should also be adaptable for use in administering other social services, e.g., medical services, as well as for other debit/credit card applications where efficiency, fraud and waste are of concern.

SUMMARY OF THE INVENTION

In accordance with one primary implementation of the present invention, there is provided a simple and versatile method that eliminates food stamps and replaces them with a debit card system that utilizes many of the same technologies and networks of the existing credit card system. This method provides novel security measures and novel means for compelling food merchants' unsupervised compliance regarding the verification of the identity of the authorized user of the card. This method may be defined as a method of administering public assistance programs for food purchases while eliminating the excessive costs, inefficiencies, fraud and waste associated with food stamps. The method comprises issuing to each authorized recipient of public assistance for food purchases at least one card including (i) a recipient identifier encoded thereon, (ii) a photographic likeness of the recipient and (iii) an arrangement of numerals that encode and reveal a unique PIN when overlaid by an appropriate, current mask, with the photographic likeness and arrangement of numerals appearing on the same card. Under the authority of the responsible social services agency, food assistance recipient account files are maintained that reflect the current account balance for each authorized recipient. Each account file is periodically replenished with new credit according to the prescribed allotment for the recipient. A plurality of masks are provided for each food merchant, each mask being registerable over the arrangement of numerals to reveal a personal identification number ("PIN"). Under authority of the responsible social services agency, each food merchant is notified on a periodic or random basis of the appropriate, then-current mask to be used in registration over cards to determine PINs during an identifiable period of time. Each food purchase transaction between a food assistance recipient and food merchant is carried out by:

(A) having the food merchant register the then-current mask over the arrangement of numerals on the recipient's card to reveal the unique then-current PIN, while compelling unsupervised merchant compliance regarding the identity of the card user versus the photographic likeness on the card and (B) providing a card processing station at each food merchant location and utilizing the station to input to a banking network (i) the recipient identifier, (ii) the debit charge associated with the purchase and (iii) the then-current PIN for the recipient as determined by utilization of the mask;

The transaction is approved or declined by determining the sufficiency of the recipient's account balance to cover the amount of the transaction.

In another aspect, the present invention may be defined as a debit/credit card system that compels a merchant's unsupervised compliance regarding the verification of the identity of the user of the card at the time of a debit/credit transaction, said system comprising:

a card bearing a photographic likeness of the authorized user of the card and an arrangement of numerals that encode and reveal a PIN when overlaid by an appropriate mask;

a plurality of masks at each point-of-sale location where the card may be used in a transaction, each mask being registerable over the arrangement of numerals on the card to reveal a PIN;

each mask having its own identifier to distinguish it from the other masks, and each identifier being associated with a time interval during which its respective mask is authorized to be used to determine the unique PIN for that time interval;

whereby the merchant must overlay the card with the then-authorized mask to determine the unique PIN that is necessary to authorize the transaction and in so doing has the photographic likeness of the authorized user of the card in full view for a period of at least several seconds.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

The present invention will be described primarily with respect to a debit card system having utility in administering a social services program, namely, a program designed to replace food stamps. However, it will be appreciated that the invention has application to any debit or credit card system where it is desirable to have clerks handling transactions verify that the user of the card is the authorized holder of the card.

Figure 1:
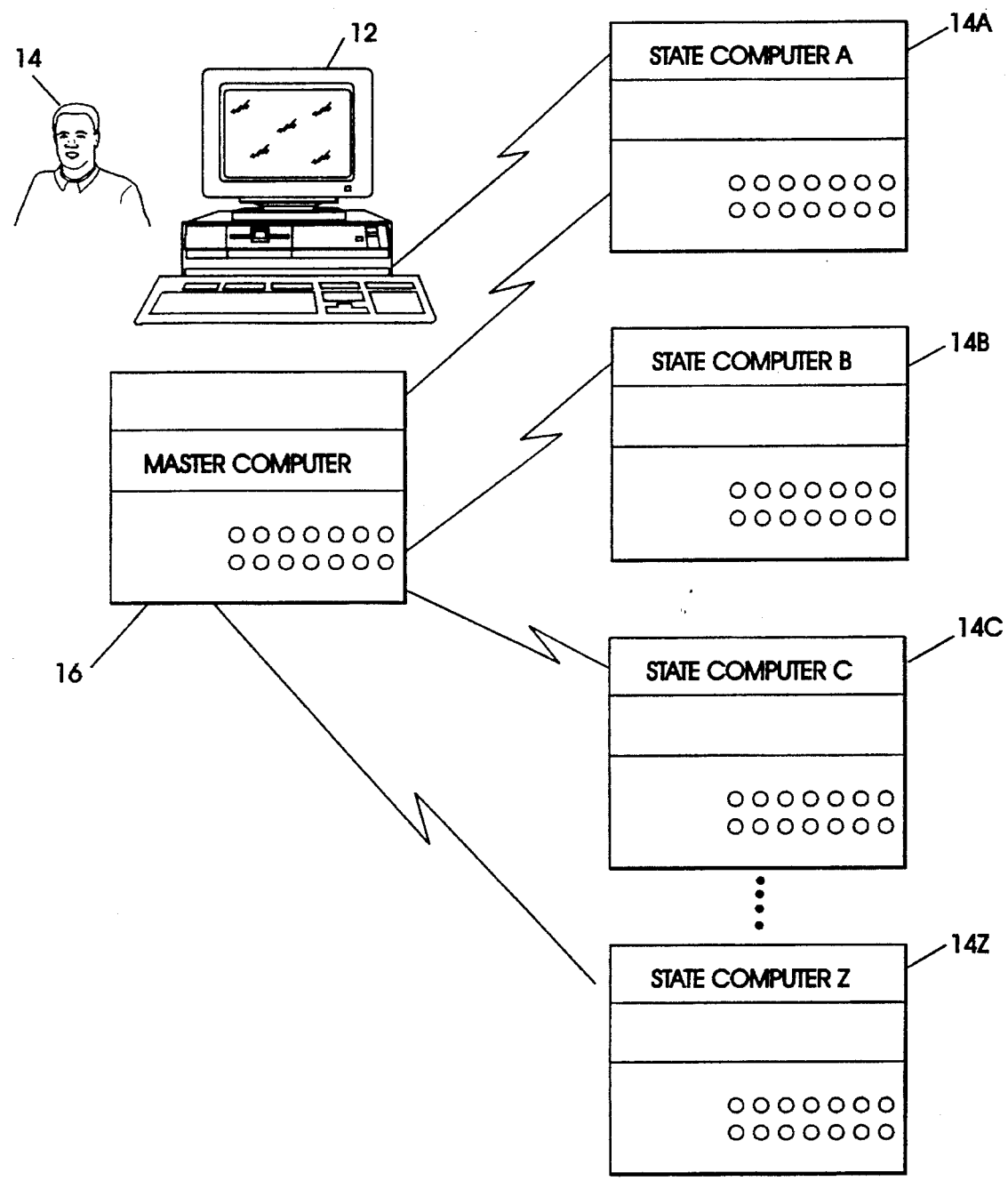
FIG. 1 is a schematic representation of the relationship between a social services worker who monitors and updates the account files of food assistance recipients, the state computer that stores the account information and the master computer that stores account balances from multiple state computers and approves or declines transactions to the banking network.

Referring to FIG. 1, there is shown a schematic representation of a portion of the computer network aspect of the present invention. A PC 12 of a social services worker 14 is one of many PCs used by social service workers of a government entity to monitor and update the account files of food assistance recipients. The social services worker uses PC 12 to replenish the recipient account at regular intervals (usually in the form of a monthly allocation), to amend the authorization or to terminate authorization in cases where the recipient has moved off the welfare rolls. Information entered at PC 12 is transmitted to a state computer 14A which stores information in account files for all recipients in a given geographical area, for example, an entire state, a portion of a state, or a large metropolitan area. State computer 14A, along with state computers 14B, 14C . . . 14Z for other geographical areas, for example a nationwide network, communicates with a master computer system 16, shown as a single computer in FIG. 1 for ease of illustration. Updated account information is transmitted from each state computer to the master computer on an ongoing basis. The purpose of the master computer is to obtain information from and supply information to the state computers and to communicate with the banking network in authorizing food sale transactions between recipients and food merchants. It will be apparent that the master computer may consist of a number of computers arranged in appropriate fashion for receiving, processing and transmitting information. For example, a computer hub arrangement may be used. Furthermore, master computer 16 is programmed to contain the bulk of the specialized software for this food stamp replacement system, thus eliminating the need for a large degree of specialized programming at the level of each state computer.

Figure 2:
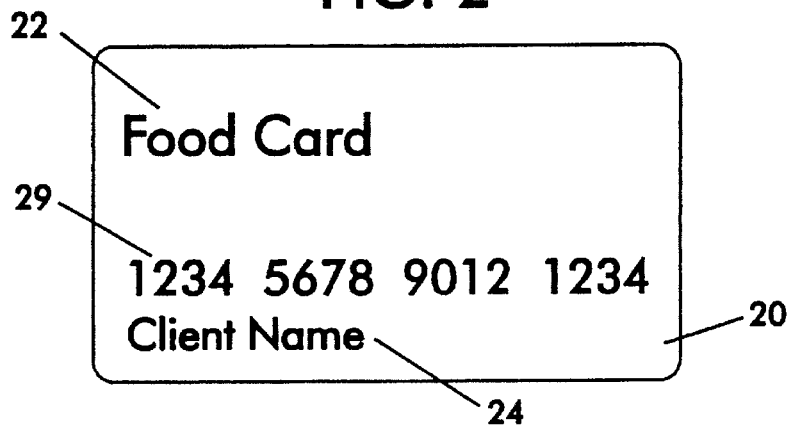
FIG. 2 illustrates the front face of the first card of a two-card system of the invention.
Figure 3:
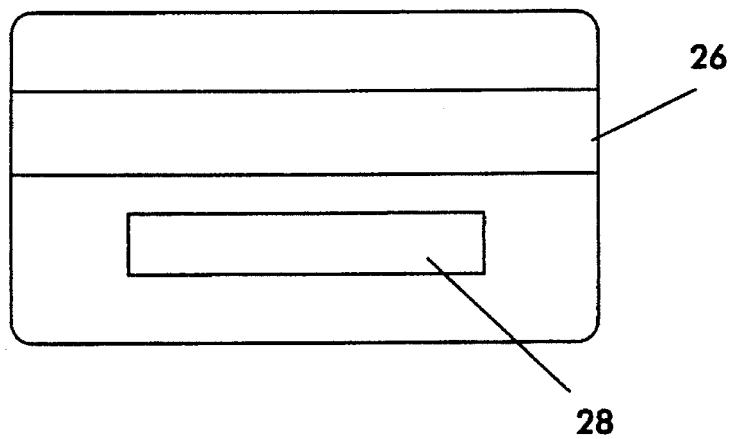
FIG. 3 is a rear view of the first card.
Figure 4:
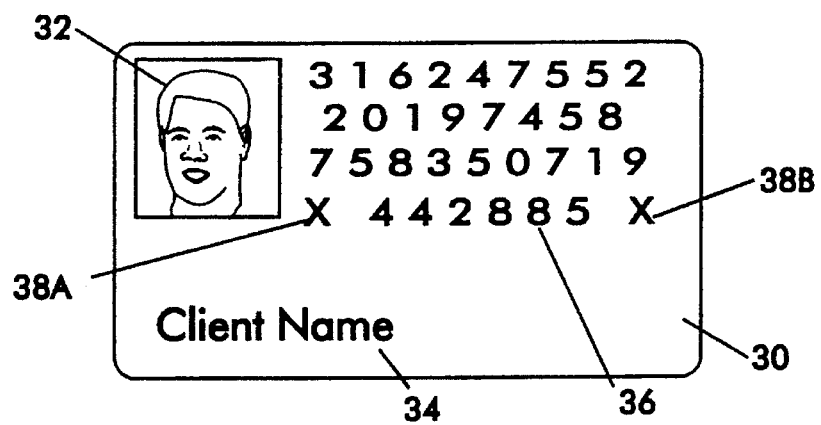
FIG. 4 illustrates the second card of the two-card system. The second card is a photo ID card having a photographic likeness of the recipient and an arrangement of numerals that encode and reveal a unique PIN when overlaid by an appropriate mask.

FIGS. 2–4 show a two-card system for use in accordance with the present invention. A first debit card 20, formed of conventional plastic material or other suitable material, includes a front face 22 having an identification of the card type such as "FoodCard," a debit card number 29, e.g., 1234 5678 9012 1234, and the authorized food assistance recipient's name 24. The rear face of card 20 includes a conventional magnetic recording strip 26 onto which the recipient's account number is magnetically recorded along with, optionally, a daily transaction amount limit. The rear face may also include a signature strip 28 for displaying the signature of the recipient.

The second card 30 (FIG. 4) of the two-card system is a photo ID card formed of plastic or other suitable material. Card 30 includes a photograph 32 of the recipient, the recipient's name 34 and an arrangement of numerals 36 which, as discussed in detail below, encode and reveal a unique PIN when overlaid by an appropriate mask. The arrangement of numerals 36 may take the form of columns and rows of numerals (0–9), for example four lines of numerals in staggered columns with eight or nine numerals per line as illustrated in FIG. 4. The arrangement of numerals may take other suitable forms that are adapted to be overlaid by a mask to reveal a PIN. Card 30 also includes a pair of locator markings 38A, 38B that are utilized to assist in precise registration of a mask over card 30, as described in detail below.

Figure 5:
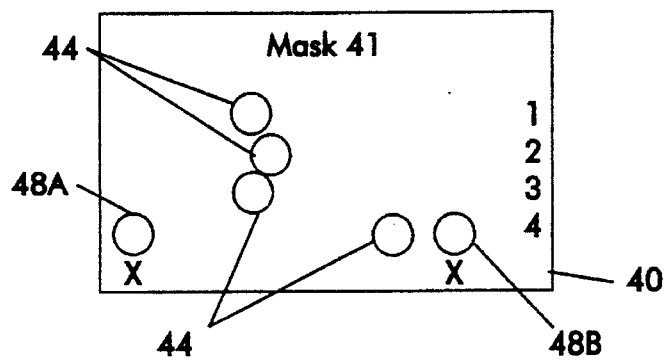
FIG. 5 illustrates a mask.
Figure 6A:
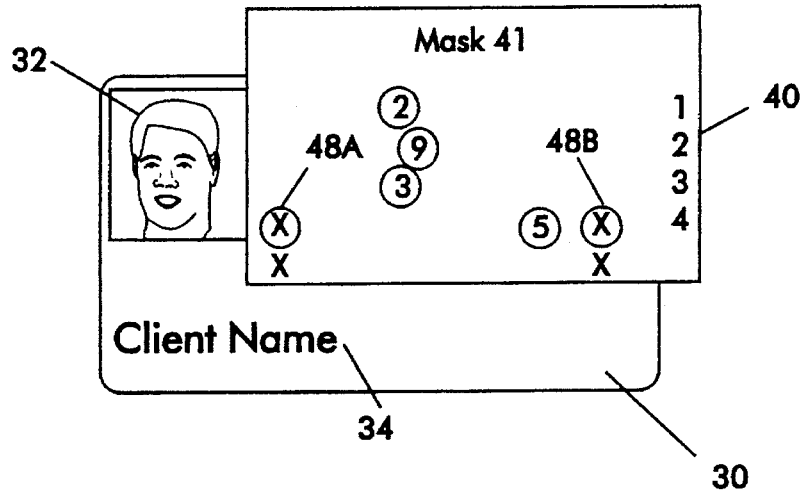
FIG. 6A is a view of the mask positioned in registration over the photo ID card to reveal a unique, current PIN.
Figure 6B:
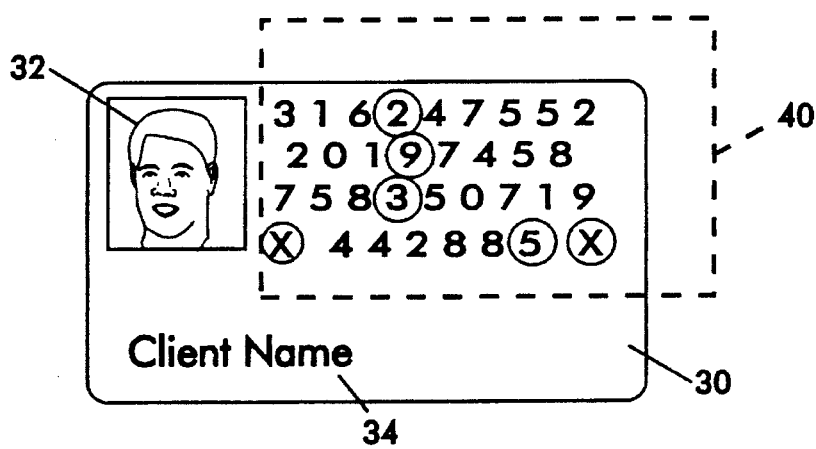
FIG. 6B is a view similar to FIG. 6A, but showing the mask in phantom lines.

FIGS. 5, 6A and 6B illustrate how photo ID card 30 is used in a commercial transaction between a food assistance recipient and a food merchant. When the recipient wishes to pay for a food purchase, he or she must present the photo ID card 30 to the merchant. The merchant then must place the appropriate mask over the arrangement of numerals 36 on card 30 to reveal a PIN. In this regard, the merchant is supplied with multiple masks with only one mask being authorized for use on any given day. In the alternative, a more irregular or random schedule may be used to determine the appropriate mask for use on a given day. For example, the merchant may be supplied with fifty-two masks, one for each week of the year, with one mask being authorized for use each week.

For use with an arrangement of numerals 36 in four rows, as illustrated, each mask 40 has four openings 44 positioned so as to reveal one numeral in each of the four rows. The revealed number is the PIN, for example, "2935" as shown in FIG. 6A. The mask shown in FIGS. 5 and 6A includes the identifier "Mask 41" which indicates that it is the correct mask to use during week 41 of the year. Thus, the masks may be rotated on a regular basis, for example, weekly. In the alternative, masks may be rotated on an irregular or random basis according to instructions supplied to the merchants. In any event, the unique PIN that is valid on a given day can be determined by the merchant only by registering the appropriate current mask over the card. This procedure forces the merchant to handle the card and manipulate it in such a way that the photograph 32 on card 30 will be in full view for a period of at least several seconds, typically about three to ten seconds. Thus, the procedure compels or strongly encourages the merchant's unsupervised compliance regarding verification of the identity of the user of the card. Verification is further encouraged by the merchant's knowledge that a historical profile showing his establishment's record with respect to fraudulent or unauthorized transactions will be maintained. Another incentive may be cash awards to clerks who successfully detect attempts at unauthorized card use. In this regard, a special four digit code may be established for entry in the place of the PIN in those instances where the clerk determines that the customer is not the authorized owner of the card.

Figure 9:
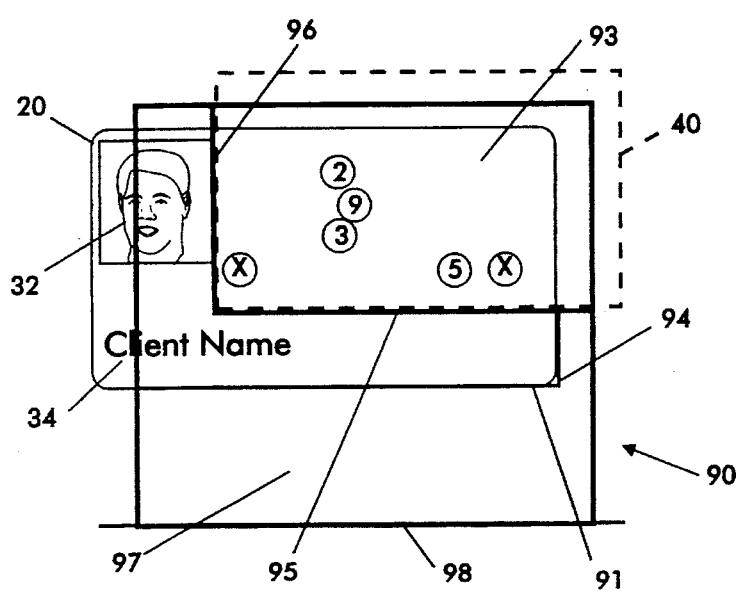
FIG. 9 shows the rack-type system used to assist in the precise registration of the mask over the photo ID card.
Figure 10:
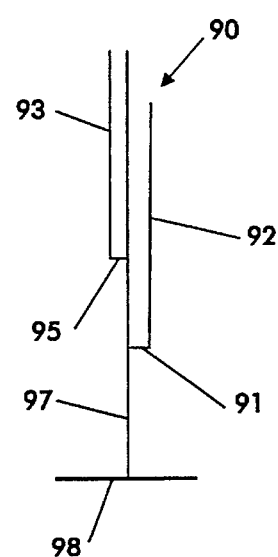
FIG. 10 is a right side view of the rack-type system of FIG. 9 with the mask and photo ID card removed.

The correct registration of mask 40 over photo ID card 30 may be achieved by any suitable means. In the illustrated embodiment, registration is achieved by use of a rack-type system 90 (FIGS. 9 and 10) that provides a first rearwardly disposed pocket 91 for holding photo ID card 30 and a second forwardly disposed pocket 95 for holding mask 40. System 90 includes a base 98, an upstanding support 97, pocket face plates 92, 93 and pocket end stops 94, 96. System 90 preferably is formed of clear plexiglass or similar material to permit view of the card through the material. In use, photo ID card 30 is inserted into rear pocket 91 until the right edge of card 20, as shown in FIG. 9, abuts stops 94, with the bottom of card 30 resting on the base of pocket 91. Next, mask 40 is inserted into front pocket 95 until the left edge of mask 40 abuts stop 96, with the bottom of mask 40 resting on the base of pocket 95. In this orientation, card 30 and mask 40 should be in registration with the locator markings 38A, 38B showing through mask locator openings 48A, 48B and with the PIN, "2935," showing. It will be appreciated, however, that imprecise fabrication of card 30 may result in the need for the clerk to slightly adjust the relative position of the mask to the card to achieve registration. As stated above, throughout the process of determining the PIN, the clerk has the photograph on ID card 20 in full view for a period of at least several seconds.

Figure 7:
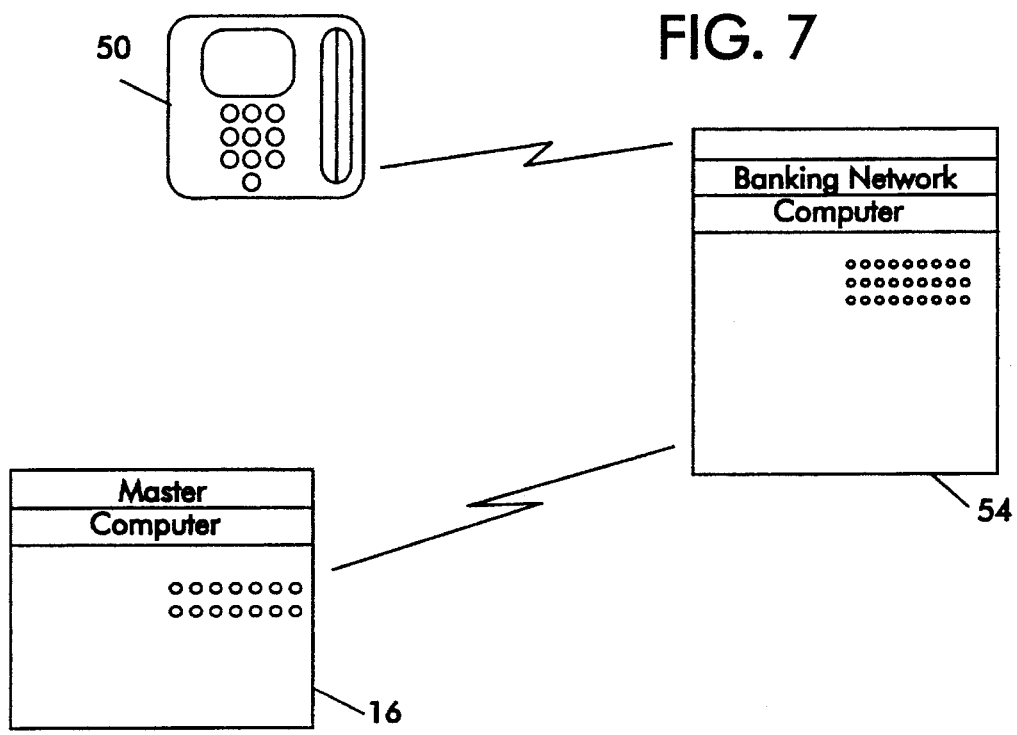
FIGS. 7 and 8 are schematic representations of a transaction between a recipient of food assistance and a food merchant.
Figure 8:
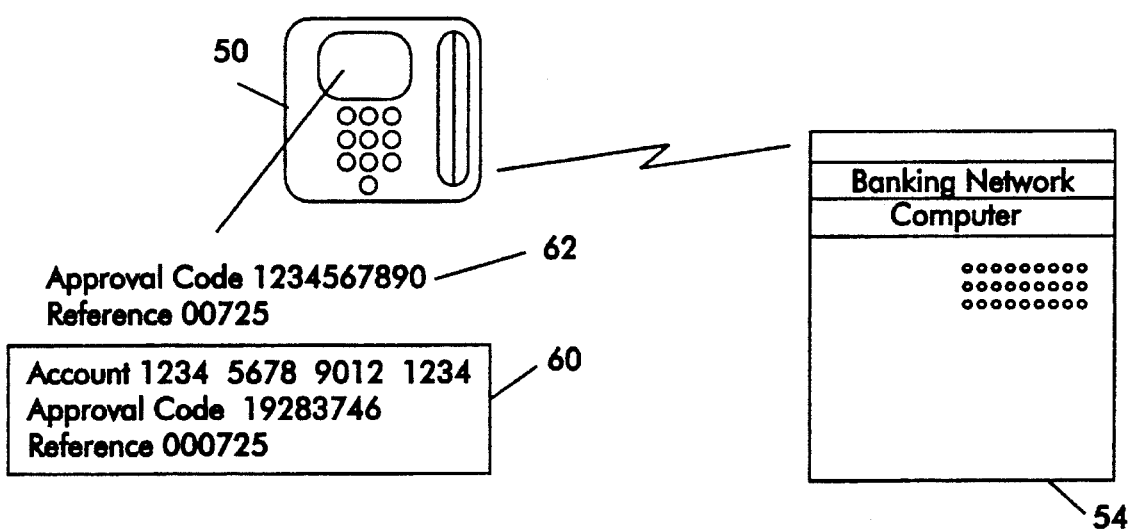

FIGS. 7 and 8 show a complete transaction between a food assistance recipient and a merchant. The merchant enters the amount of the purchase, the PIN, a store ID, date and time into the conventional point-of-sale terminal 50 by means of the keyboard after having "swiped" card 20 through the terminal to enter the recipient's account number. This information is sent by conventional means to the banking network computer 54 which requests approval from master computer 16. In the usual circumstance where the recipient's account balance is sufficient to cover the amount of the transaction, an approval signal is returned. In those situations where the account balance is insufficient, a decline signal will be returned. An alert signal may be returned in situations where the card has been reported stolen.

Referring to FIG. 8, upon approval, the recipient's balance is printed on a receipt 60 along with an approval code. Subsequently, funds are electronically transferred from the state's account to the appropriate banks. The banks then distribute the funds to the merchant in accordance with well-known procedures utilized by the banking network.

Figure 11:
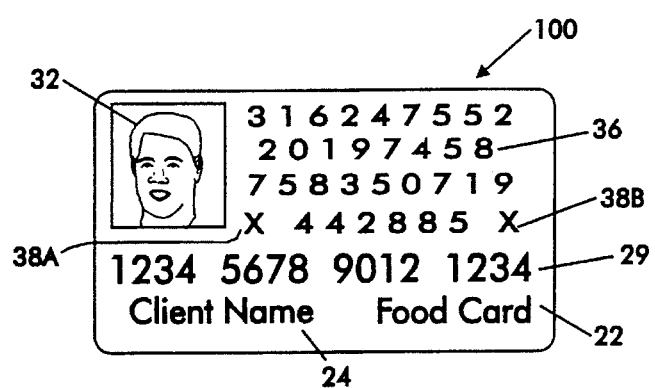
FIG. 11 is a view of a single card system wherein the card includes a recipient identifier encoded thereon, a photographic likeness of the recipient and an arrangement of numerals that encode and reveal a unique PIN when overlaid by an appropriate mask.

FIG. 11 illustrates a single card 100 containing all of the information that was contained on the two cards 20 and 30 discussed above. The use of single card 100 is virtually identical to that of the two-card system with the exception that the single card serves as both the account number-bearing debit card that is swiped through the point-of-sale terminal and the photo ID card that is overlaid by a mask to reveal the PIN.

Summary of Certain Features and Advantages of the Invention

1) Card(s) cannot be used for non-food uses.
2) In the two-card system, periodic or random changes of PIN prevent transfer of the debit card without also transferring the photo ID card.
3) In those situations where the PIN, photograph and name are on the same card, a recipient will be less likely to transfer card.
4) A complete audit trail discourages merchant and recipient fraud.
5) Off-the-shelf technology requires no changes to the banking network or state computers.
6) The invention eliminates cost of certified mail used to assure receipt of food stamps by recipients.
7) The invention eliminates use of paper.
8) Handling charges paid to merchants are eliminated.
9) Lost cards can be replaced. Lost stamps cannot be replaced.
10) The invention can be adapted and used for other social services such as payment for health care.
11) No cash or merchandise of any kind other than approved food items can be delivered to the food assistance recipient by the merchant.
12) A purchase can be authorized as quickly as a credit card transaction using the existing banking network.

While the present invention has been described in connection with certain illustrated embodiments, it will be appreciated that modifications may be made without departing from the true spirit and scope of the invention.

That which is claimed is:

1. A method of administering public assistance programs for food purchases while eliminating the excessive costs, inefficiencies, fraud and waste associated with food stamps, said method comprising:

issuing to each authorized recipient of public assistance for food purchases at least one card including (i) a recipient identifier encoded thereon, (ii) a photographic likeness of the recipient and (iii) an arrangement of numerals that encode and reveal a unique PIN when overlaid by an appropriate, current mask, with the photographic likeness and arrangement of numerals appearing on the same card;

under the authority of the responsible social services agency, maintaining food assistance recipient account files that reflect the current account balance for each authorized recipient and periodically replenishing each account with new credit according to the prescribed allotment for the recipient;

providing a plurality of masks to each food merchant, each mask being registerable over said arrangement of numerals to reveal a PIN;

under authority of the responsible social services agency, notifying each food merchant on a periodic or random basis of the appropriate, then-current mask to be used in registration over cards to determine PINs during an identifiable period of time;

carrying out each food purchase transaction between a food assistance recipient and food merchant by:

(A) having the food merchant register the then-current mask over the arrangement of numerals on the recipient's card to reveal the unique then-current PIN, while compelling unsupervised merchant compliance regarding the identity of the card user versus the photographic likeness on the card and (B) providing a card processing station at each food merchant location and utilizing the station to input to a banking network (i) the recipient identifier, (ii) the debit charge associated with the purchase and (iii) the then-current PIN for the recipient as determined by utilization of the mask;

approving or declining the transaction by determining the sufficiency of the recipient's account balance to cover the amount of the transaction.

2. The method of claim 1 including the steps of processing the transaction between the recipient and food merchant through an existing banking card network, with the banking card network having read-only access to the account file information that is maintained under authority of the social services agency.

3. The method of claim 2 wherein the recipient accounts are periodically replenished with credit.

4. The method of claim 1 including the step of creating profiles of recipient purchase histories to detect fraud or abuse.

5. The method of claim 1 including the step of providing recipients with telephone access to their account balances.

6. The method of claim 1 wherein each recipient is issued a single card containing the encoded recipient identifier, the photographic likeness of the recipient and the arrangement of numerals.

7. The method of claim 1 wherein each recipient is issued two cards comprising a first card containing the encoded recipient identifier and a second photo ID card containing both the photographic likeness of the recipient and the arrangement of numerals.

8. The method of claim 1 including the step of providing a code for entry by the food merchant at the time of a transaction if the merchant determines that the card is being misused or is stolen.

9. A debit/credit card system that compels a merchant's unsupervised compliance regarding the verification of the identity of the user of the card at the time of a debit/credit transaction, said system comprising:

a card bearing a photographic likeness of the authorized user of the card and an arrangement of numerals that encode and reveal a PIN when overlaid by an appropriate mask;

a plurality of masks at each point-of-sale location where the card may be used in a transaction, each mask being registerable over the arrangement of numerals on the card to reveal a PIN;

each mask having its own identifier to distinguish it from the other masks, and each identifier being associated with a time interval during which its respective mask is authorized to be used to determine the unique PIN for that time interval;

whereby the merchant must overlay the card with the then-authorized mask to determine the unique PIN that is necessary to authorize the transaction and in so doing has the photographic likeness of the authorized user of the card in full view for a period of at least several seconds.

10. A debit card system for use with existing electronic credit/debit card computer networks to facilitate food purchase transactions by authorized recipients of public assistance for food purchases, said system serving as a preferred alternative to the use of food stamps and comprising:

a card bearing a photographic likeness of an authorized recipient of public assistance and an arrangement of numerals that encode and reveal a PIN when overlaid by an appropriate mask;

a plurality of masks at each point-of-sale location where the card may be used in a transaction, each mask being registerable over the arrangement of numerals on the card to reveal a unique PIN;

each mask having its own identifier to distinguish it from the other masks, and each identifier being associated with a time interval during which its respective mask is authorized to be used to determine the unique PIN for that time interval;

whereby the merchant must overlay the card with the then-authorized mask to determine the unique PIN that is necessary to authorize the transaction and in so doing has the photographic likeness of the authorized user of the card in full view for a period of at least several seconds.

\* \* \* \* \*